Figure 1:
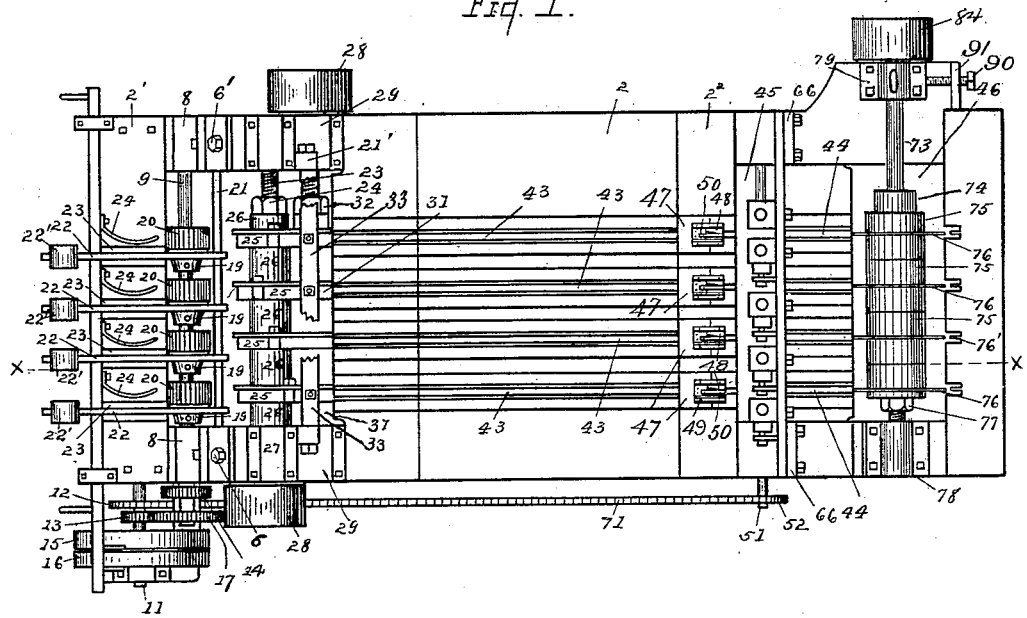

(No Model.) 3 Sheets—Sheet 1.

F. M. KENNEDY.
WOOD MOLDING AND SAWING MACHINE.

No. 602,507. Patented Apr. 19, 1898.

WITNESSES: N. Webster Schlater, Minnie E. Schlater

Frank M. Kennedy INVENTOR

BY Chapin & Denny
his ATTORNEYS (No Model.) F. M. KENNEDY. 3 Sheets—Sheet 2.
WOOD MOLDING AND SAWING MACHINE.
No. 602,507. Patented Apr. 19, 1898.
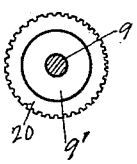
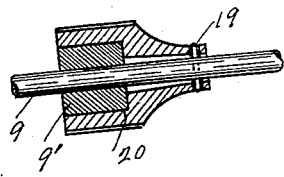
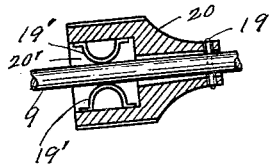
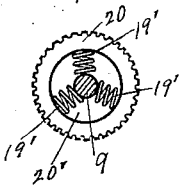
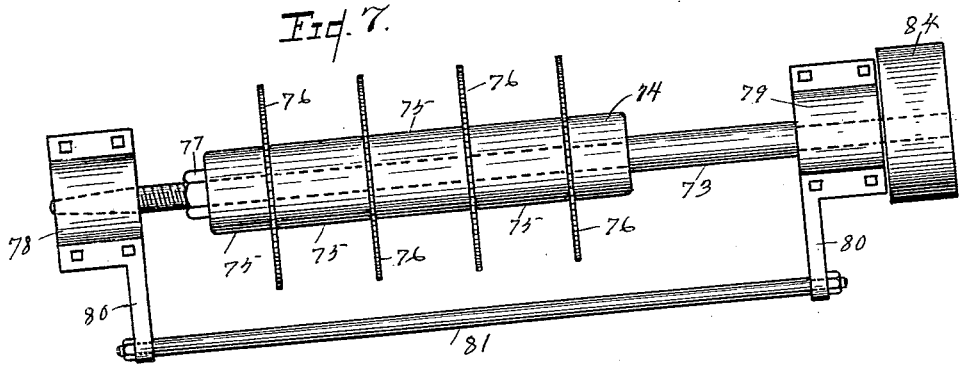
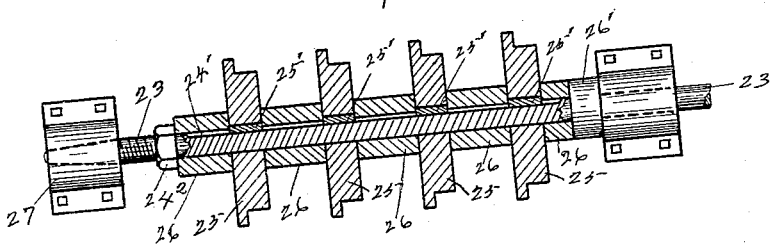
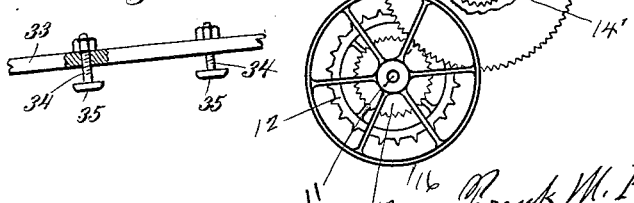
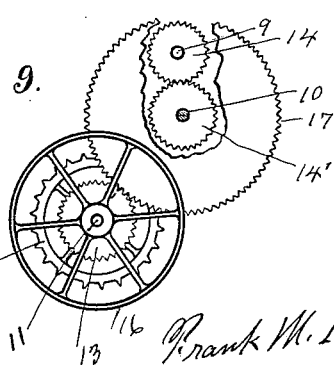
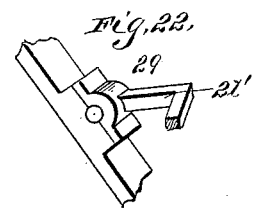
WITNESSES:
N. Webster Schlater
Minnie E. Schlater
Frank M. Kennedy INVENTOR
BY Chapin & Denny
HIS ATTORNEYS.

(No Model.) 3 Sheets—Sheet 3.
F. M. KENNEDY.
WOOD MOLDING AND SAWING MACHINE.
No. 602,507. Patented Apr. 19, 1898.
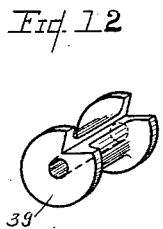
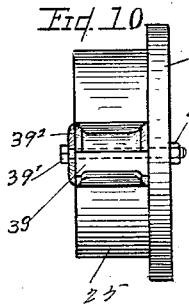
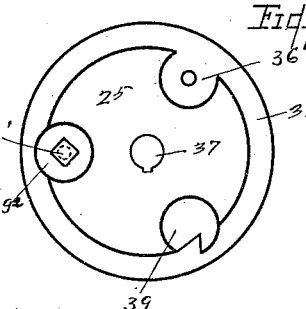
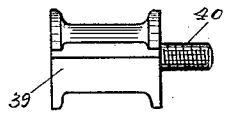
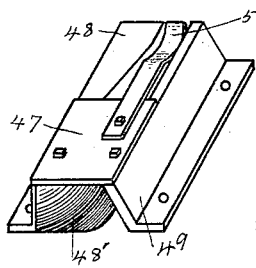
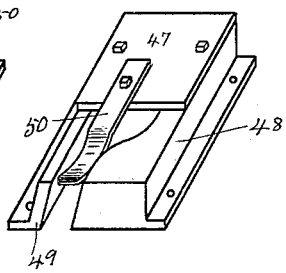
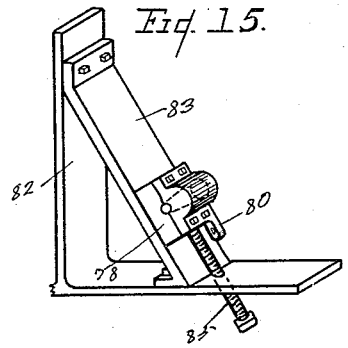
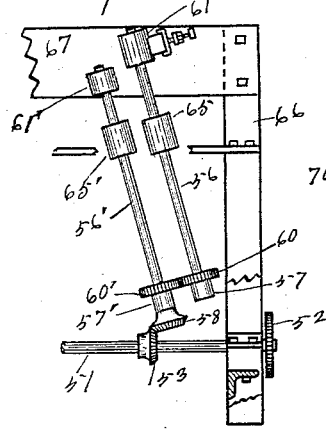
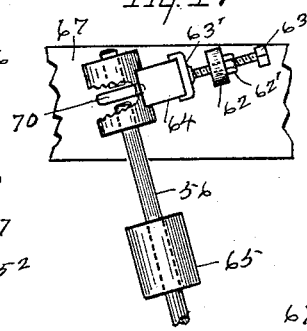
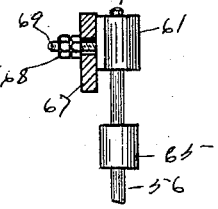
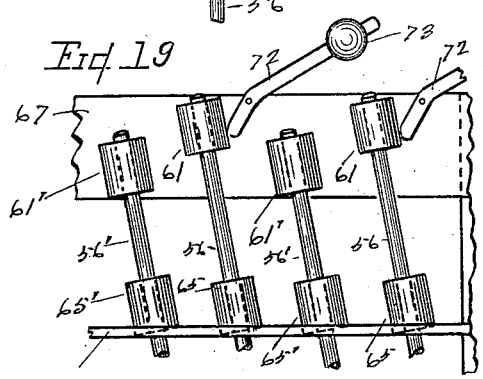
WITNESSES: N. Webster Schlater, Minnie E. Schlater
Frank M. Kennedy INVENTOR
BY Chapin & Denny
his ATTORNEYS

United States Patent Office.

FRANK M. KENNEDY, OF CELINA, OHIO, ASSIGNOR OF ONE-HALF TO JANE W. STONE, OF BROOKLYN, NEW YORK.

WOOD MOLDING AND SAWING MACHINE.

SPECIFICATION forming part of Letters Patent No. 602,507, dated April 19, 1898.

Application filed November 25, 1895. Serial No. 570,062. (No model.)

*To all whom it may concern:*

Be it known that I, FRANK M. KENNEDY, a citizen of the United States, residing at Celina, in the county of Mercer, in the State of Ohio, have invented new and useful Improvements in Wood Molding and Sawing Machines; and I do hereby declare that the following is a full, clear, and exact description of the invention, which will enable others skilled in the art to which it appertains to make and use the same, reference being had to the accompanying drawings, which form part of this specification.

My invention relates to that class of hoop-sawing machines in which a plurality of rectangular hoop-bars are converted into two beveled hoops each, the molding and sawing being done in one machine.

My invention comprises a two-part upright supporting-frame longitudinally extensible and connected by a removable table, a series of coöperating feeding-rollers upon the forward portion of said frame, a corresponding number of upper and lower cutter-heads for molding the hoop-bars, a series of adjustable presser-bolts to hold said bars in operative relation with the lower cutter-heads, a series of parallel guideways arranged upon a supporting-table and in alinement with said cutter-heads, a series of tilting devices in transverse arrangement adapted to give the molded bar an inclined or oblique position, a series of oblique feed-rollers in alinement with said tilting devices having a greater speed than the said forward feeding-rollers and adapted to present the said hoop-bars to the saws, by which they are cut or divided diagonally, and a corresponding series of saws arranged upon a horizontal mandrel adapted to cut the molded or oval hoop-bars into beveled hoops.

The object of my invention is to provide an improved hoop molding and sawing machine having the following novel features and distinguishing characteristics: a series of yielding feed-rollers adapted to engage the upper surface of the hoop-bars by a yielding pressure, whereby each individual feed-roller automatically adjusts itself to the varying thickness of the respective hoop-bars; an improved form of cutter-head shaft and improved means for securing the cutter-heads therein; a transverse arrangement of adjustable pressure-bolts adapted to rigidly engage the upper face of the hoop-bar when their lower surface is presented to the lower cutter-heads; a removable table supporting the guideways, whereby the supporting-frame may readily be longitudinally extended or contracted; an improved means for tilting the hoop-bars in their passage through the guideways that they may be cut diagonally by the saws, and a series of oblique feed-rollers adapted to receive said hoop-bars from the tilting devices and presenting them to the cutting-saws and having a greater speed than the forward feed-rollers to avoid end pressure when tilting said bars.

The above features are illustrated in the accompanying drawings, in which similar reference-numerals indicate corresponding parts throughout the several views.

Figure 2:
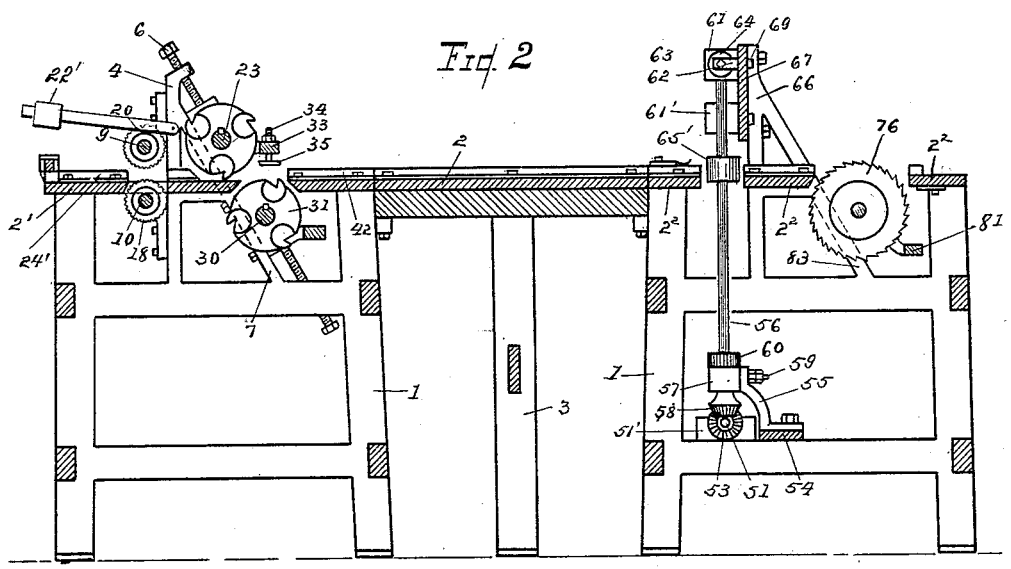

Figure 1 is a plan view of my invention, showing the relative arrangement of its operative parts. Fig. 2 is a longitudinal vertical section of the same, taken on the line $x\ x$ of Fig. 1, showing the manner of mounting the feeding-rollers and cutter-heads. Fig. 3 is a longitudinal section of one of the self-adjusting and equalizing feed-rollers, showing the internal structure of the same. Fig. 4 is a similar view of a modified form of the same. Fig. 5 is an end view of the same, showing a modified form of springs therein, and Fig. 6 is an end view of Fig. 3. Fig. 7 is a detail of the saw-mandrel, with the saws in position thereon. Fig. 8 is a detail of the cutter-head shaft, with the cutters in position thereon, taken in longitudinal section to show the keyways in the shaft and the keys in the cutter-heads. Fig. 9 is an enlarged detail side view of the means for actuating the horizontal feeding-rollers. Figs. 10 and 11 are details of the cutter-head, and Fig. 12 is a detail of one form of the cutter-bits. Figs. 13 and 14 are detail perspective views of the tilting device. Fig. 15 is a detail of the conical bearing for one end of the saw-mandrel. Figs. 16, 17, 18, and 19 are details of the oblique feed-rollers, showing the means for adjusting the same. Fig. 20 is a detail of a modified form of the cutter-bits. Fig. 21 is a detail showing the engagement between the cross-bar 33 and the pressure-bolts 34, and Fig. 22 is a detail showing the manner in which the supporting-lugs for the ends of said bar 33 are secured to the journal-boxes 29.

The two-part metallic supporting-frame 1, of any proper form and dimensions, is united by the central table-section 2, having a proper supporting-frame 3 therefor, Fig. 2. Upon the forward section of said frame and at the sides thereof are arranged the integral upright standards 4, having an inclined apertured top for the respective adjusting-screws 5 and 6, and the integral oblique arms or portions 7, adapted to support the cutter-head shafts. Upon the forward face of the said standards are rigidly fixed proper journal-boxes 8, Fig. 1, for the extremities of the upper-feed-roller shaft 9, rotatable therein. Upon the same face of said standards 4 and in vertical alinement with said journal-boxes 8 are rigidly secured other similar or suitable journal-bearings for the ends of the rotatable shaft 10, the said bearings not being shown in the drawings.

In proper bearings at one side of the machine is revolubly mounted the short horizontal shaft 11, carrying near its inner end a rigid sprocket-wheel 12 and a fixed gear-wheel 13 and upon its outer end the belt-pulleys 15 and 16, one of which is a loose pulley and the other a tight pulley for the purpose of shifting the driving-belt in a well-understood manner. On one extended end of said shaft 9 are fixed the rigid gear-wheels 14 and 17, the former meshing with a corresponding gear 14' on the adjacent end of the lower-feed-roller shaft 10 and the latter meshing with and actuated by the said gear-wheel 13. The lower feed-roller 18, fixed on the said shaft 10, may be one continuous metallic roller, or it may be constructed in sections, if desired; but in either case it is preferably longitudinally fluted or corrugated to better grip the side of the hoop-bar in forcing it onward to the cutter-heads.

On the rotatable shaft 9 are fixed a series of feeding-rollers 20, having a corrugated perimeter arranged in alinement with the respective cutter-heads, hereinafter described. The said rollers 20 are identical in construction and have a reduced tapering end diametrically apertured to loosely receive the extended ends of the diametric pin 19, rigidly fixed in shaft 9. The corrugated ends of said rollers have an annular space surrounding the shaft 9, in which is arranged a series of radial springs 19, Figs. 4 and 5, or a piece or collar of rubber 9 or other resilient substance, Figs. 3 and 6. The bore or shaft-opening in the remaining portion of the said rollers 20 is of somewhat greater diameter than said shaft 9, and the said lateral perforations in said roller are of slightly-greater diameter than that of the said pin 19, whereby the said rollers 20 are adapted for a limited lateral adjustment or yielding pressure to conform to the slightly-varying thickness of the hoop-bars. The roller 20 may be of one piece, with a corresponding rubber collar 9', similarly arranged therein, without departing from the scope of my invention. Immediately at the rear of the said feed-rollers 20 is fixed a transverse bar or plate 21, having its ends secured to the upper portion of said standards 4. On this bar 21 the inner ends of the forwardly-extending lever-arm 22 are pivoted or hinged in any proper manner, having upon their free end a proper adjustable weight 22' and resting upon the reduced tapering portion of said roller 20 to keep them in proper contact with the said hoop-bars. While these weighted lever-arms are not an essential feature of my invention and can be omitted at pleasure, yet their use is desirable in some cases.

At the forward end of the machine is arranged a plurality of parallel guideways formed by the flanges 24' and the curved springs adapted to keep the hoop-bar in alinement as it is passing through the adjacent feed-rollers.

Upon the outer and rear face of the oblique supports 7 are arranged two longitudinal elongated bolt-apertures at a proper distance from the respective extremities thereof. In the upper one of these openings are firmly but adjustably secured by proper holding-bolts the journal-boxes 27 for the ends of the cutter-head shaft 23, and in the lower one of said apertures are similarly secured the journal-boxes 29 for the ends of the lower cutter-head shaft 30. The said shafts 23 and 30 are thus adapted for a limited vertical adjustment on their supports 7 by means of the adjusting-screws 6 and 6', respectively, Fig. 2. On the said shaft 23 are properly keyed or otherwise fixed a series of cutter-heads 25, separated by proper spacing-collars 26, arranged in alinement with the working perimeter of the said rollers 20 and secured in position by the threaded nut $24^2$. The preferable construction is shown in Fig. 8, in which the said shaft 23 is provided with a continuous longitudinal keyway 24', and the cutter-heads 25 are each provided with a keyway adapted to receive a proper key 25', by which the said cutter-heads are rigidly fixed on said shaft. On the said shaft 30 are similarly arranged and rigidly fixed a similar number of cutter-heads 31, preferably identical in size and construction with those of the said parallel shaft 23. The cutter-heads also have a series of spacing-collars 31 and are secured in their relative arrangement by means of the nut 32. The said cutter-heads are not in vertical alinement, thereby affording a proper clearance. The said cutter-heads are cylindrical in form, have an annular flange 36 upon one side thereof, and have a shaft-opening 37, provided with a proper keyway and keys 25', as described. The said heads are provided with a series of semicircular peripheral longitudinal recesses or bit-seats 36', adapted to contain the respective cutter-bits 39, which are provided in one form of construction with an integral screw-threaded stem 40, rigidly secured in a corresponding perforation in said head by means of a proper holding-nut 40'. The said cutting-bits are so arranged in said head that the width of the peripheral opening of said bit-seats is slightly less than the diameter of said bits, whereby the said bits can only be displaced or removed from their seats longitudinally even were the said supporting-stem to be broken when in operation. The said bits are so arranged in their seats as to have a sufficient peripheral projection to properly engage the hoop-bar and are flush with the front face of said head. It is obvious that this manner of mounting the cutter-bits relieves the supporting-stem 40 from all undue centrifugal strain and greatly simplifies the construction, as there are thus but three parts or pieces—viz., the head, the bit, and the holding-nut 40. As the bits accurately fit their recessed seats, they are perfectly balanced, can be readily manipulated, and are absolutely secure against centrifugal displacement in case of accident. Instead of the integral threaded supporting-stem 40 the said cutting-bits may be centrally apertured, as shown in Fig. 12, and then secured in position by means of a proper holding-bolt 39', having a washer 39², Figs. 10 and 11. The said cutter-head shafts 23 and 30 are provided with the respective rigid belt-pulleys 28 and 28', adapted to be actuated by proper belts from an overhead shaft. (Not shown.) Immediately adjacent to the said cutter-heads 25 and directly above the said lower cutter-heads 31 is arranged the cross-bar 33, having its ends rigidly fixed to the upright lugs 21' on the journal-boxes 29. In this cross-bar are adjustably secured by a screw-threaded connection a series of pressure-bolts 34, having upon their lower end a flattened disk or head 35, adapted to bear against the upper surface of the hoop-bar and firmly hold it down in its supporting-guideway while said bar is being operated upon by the adjacent lower cutter-head. The bolts 34 are readily adjusted by means of a wrench to suit any desired thickness of bar and are rigidly secured in such position by proper jam-nuts upon the upper ends. The said presser-bolts are arranged in vertical alinement with the said lower cutter-heads, respectively.

The forward section of my machine has a horizontal table 2', divided into three parallel longitudinal sections, the forward longitudinal opening being for the said lower feed-roller, and the rear opening is for the lower cutter-head. The said sections are each provided with the alined guideways 42, in parallel arrangement, of proper width to contain and direct the hoop-bars to the said cutter-heads. The central table 2, rigidly supported upon a frame 3 and in horizontal alinement with said table 2', is also provided with a series of parallel guideways 43, in alinement with the said guideways 42 and adapted to receive the hoop-bar after having been operated upon by the cutter-bits. The rear section of my machine is provided with a table 2², having a series of guideways 44, in horizontal alinement with said guideways 43. The table 2 is also provided with the transverse parallel openings 45 and 46, the former for the oblique feed-roller, hereinafter described, and the latter for the cutting-saws. On the forward portion of said table 2², in alinement with said guideways, are rigidly fixed a series of tilting devices comprising the tilting plate 48, whose inner face 48' is inclined and rearwardly tapering until at its rear end it assumes nearly a vertical position, Figs. 13 and 14, the guide-plate 49, whose inner face has the same incline it is desired to impart to the hoop-bars, a cap 47, rigidly fixed on said plates, and the spring 50, fixed on said cap, as shown, and having its free end arranged in vertical alinement with the space separating the rear end of said plates, the said cap and said spring being adapted to keep the hoop-bar in firm contact with the face 48' of the said plate 48 and with the table 2². As the hoop-bar enters the said tilting device it is received by the said inclined face 48' and gradually tilted until it passes out of said device at the discharge end thereof.

The transverse horizontal shaft 51, rotatably mounted in suitable journal-bearings 51' in the lower part of the rear section of the main frame 1, carries upon its outer extended end a rigid sprocket-wheel 52 of somewhat less diameter than that of the said sprocket-wheel 12, with which it is connected, and actuated by means of the sprocket-chain 71, Fig. 1. At proper intervals on the shaft 51 are arranged a series of rigid bevel gear-wheels 53 for actuating the feed-roll shafts. To the opposite sides of the frame 1 and at the rear edge of the said opening 45 are provided a pair of rigid upright standards 66, to the front face of which are rigidly bolted the horizontal cross-plate 67 and the adjustable journal-boxes 61 and fixed boxes 61', Figs. 16 and 19. In these boxes are rotatively mounted the upper ends of the oblique or inclined roller-shafts 56 and 56', respectively. At the rear of said journal-boxes 51', Fig. 2, a cross plate or bar 54 is rigidly bolted to the frame 1. On this plate 54 are rigidly fixed a series of oblique forwardly-projecting brackets 55, to which the journal-boxes 57 and 57' are respectively secured, the journal-boxes 57 being secured to their supporting-brackets 55 by a pin or pivot-bolt. The journal-boxes 57' are rigidly secured to their respective supporting-brackets. The shaft 56' has near its upper end a roller 65' and has upon its lower end a rigid bevel gear-wheel 58, meshing with and actuated by its respective bevel gear-wheel 53. The lower ends of said shafts 56 and 56' are rotatably mounted in said boxes 57 and 57' and provided with the respective rigid meshing gear-wheels 60 and 60', by which the shafts 56 are actuated. The said shafts 56 are each provided with a fixed roller 65 when in operation. The journal-box 61 for the upper end of said shaft 56 is secured to the cross-plate 67 by means of the threaded bolt 69, provided with the holding-nut 68. This bolt 69 is arranged in an elongated slot 70 in the supporting cross-plate 67, Fig. 17, whereby the said box 61 has a limited lateral play. In a lateral bracket 62 on said plate 67 is mounted, by a screw-threaded connection, the adjusting-screw 63, having a holding-nut 62' and having upon its forward end a proper recessed head 63', in which is fixed a rubber buffer 64, adapted to bear against the outer face of the journal-box 61. The said buffer 64 may be made of any resilient material or formed of a proper spring, its function being to firmly hold the said roller 65 into a yielding engagement with the hoop-bar. The said buffer may be adjusted to limit the play of said roller by means of the said screw 63. The same function may be accomplished in substantially the same way by substituting for the said spring-buffer a weighted lever-arm 72, pivotally mounted on said plate 67 and provided upon its free end with the adjustable weight 73 and adapted to have its forward end normally engage the said journal-box 61, Fig. 19.

On the fixed or integral support 82, Fig. 15, is rigidly bolted the oblique standard 83, on which is loosely mounted the journal-box 78, vertically adjustable by means of the screw 85. This journal-box 78 is provided with a conical bearing and a removable top for the conical or tapering end of the rotatable saw-mandrel 73, the other end of which is loosely mounted in a proper bearing 79, also similarly adjustable on a proper supporting oblique standard 83, and is vertically adjustable thereon by means of the screw 90. The standard 83 is integral with the standard 66, and upon its outer edge is a lateral projection, upon which the journal-box 79 is mounted. This projection is necessary that the belt on the pulley 84 will not interfere with the belt upon the pulley 28'. On the said mandrel 73 are rigidly fixed a plurality of circular saws 76, arranged in alinement with the center of said guideways and adapted to cut the molded and tilted hoop-bars into two equal parts, after which they are discharged at the rear end of the machine. The said saws are secured in their relative position upon said mandrel by the rigid collar 74, the spacing-collar 75, and the threaded nut 77, Fig. 7. On that extended end of said mandrel which has its bearing in the journal-box 79 is rigidly fixed the belt-pulley 84, connected to a proper overhead driving-shaft. The said journal-boxes 78 and 79 are each provided with a lateral arm 80, in parallel relation and rigidly connected by the cross rod or bar 81. It is obvious that by dismounting the standard 83 from its support 82 and detaching it from the adjacent end of said rod 81 it may be readily removed endwise from said mandrel, and by removal of said nut 77 and the spacing-collars in the same manner the saws 76 may be likewise removed or replaced at pleasure.

The operation of my improvement is obvious and, briefly stated, is as follows: Power being transmitted to the machine by proper driving-belts connecting the said pulleys with a proper driving-shaft, the working parts being connected and actuated as described, the operator feeds the rectangular hoop-bars of proper dimensions for two hoops each to the horizontal feeding-rollers 18 and 20, which grip the sides of said bars and feed them onward to the cutter-heads through their respective guideways. A plurality of hoop-bars are thus fed to the cutter-heads simultaneously and at a uniform rate of speed. As the feed-rollers 20 exert a yielding pressure upon the sides of the bars with which they contact, it is obvious that the said rollers will automatically accommodate themselves to any inequalities of thickness in the said bars. The cutter-heads rotate in unison, the said bars being acted upon first by the upper cutter-heads 25, which round or mold the upper edges of said bars. They are next acted upon by the lower cutter-heads 31, being held firmly in place by the respective presser-bolts 34. The said bars are then fed forward through the said guideways 43, which are of such a length that the forward ends of the said bars are acted upon by the oblique feed-rollers just after their rear ends leave the horizontal feed-rollers. When the forward end of the said bar leaves the guideway 43, it enters the tilting device, being crowded or fed forward by the abutting and next following hoop-bar, in which it is given the same oblique or inclined position as that of the oblique feeding-rollers, by which the said bar is now acted upon and fed onward through the guideways 44 to the respective cutting-saws 76, by which the molded strips are longitudinally bisected. When the hoops are discharged from the saws, they are complete, except the lap and pointing, which must be done in other machines. As the said sprocket-wheel 52 on the shaft 51 is of a less diameter than the said wheel 12, the said oblique feed-rollers will have a somewhat greater speed than the said horizontal feed-rollers, thereby preventing any binding between the ends of the said strips when they are being tilted. The spreader 76 engages the kerf of said bar to prevent binding.

Having thus described my invention and the manner of employing the same, what I desire to secure by Letters Patent is—

1. In a machine of the class described, the combination of the revoluble shaft 9; the feed-roller 20 having in one end thereof a chamber 20' and provided with a shaft-opening of greater diameter than that of the contained supporting-shaft, for the purpose specified; a series of radial springs 19' arranged in said chamber as shown, whose inner end forms a bearing upon the said shaft; and a diametric pin 19 fixed in said shaft and having its opposite ends loosely mounted in suitable perforations in the reduced end of said feed-roller, all substantially as described.

2. A roller feed mechanism, comprising a horizontal revoluble shaft 9; a chambered roller having a corrugated periphery and a conical or tapering cylindrical extension whose central bore is of greater diameter than the said shaft on which it is fixed; a diametric pin fixed in said shaft and having its extremities loosely arranged in a radial perforation of greater diameter than said pin for the purpose specified; together with a plurality of radial springs loosely mounted in said roller, whose opposite ends form a bearing upon the said shaft and the chamber-face of said roller respectively, whereby the said roller is adapted for a yielding pressure against the hoop-bar with which it is contacted, all substantially as described.

3. In a hoop molding and sawing machine, the combination of a series of revoluble cutter-heads 25 arranged as shown; a horizontal transverse bar 33 fixed at each end to the supporting-frame and arranged at the rear of said cutter-heads and in close proximity thereto; a plurality of vertically-adjustable presser-bolts 34 mounted in said bar by a screw-threaded connection and rigidly secured in position by a proper jam-nut upon their upper end, and provided upon their lower extremity with a disk 35 adapted to engage the adjacent face of the hoop-bar; and a series of rotatable cutter-heads 31 arranged directly below said disks and adapted to coöperate therewith as described, all substantially as set forth.

4. In a hoop-making machine, a hoop-bar tilting device comprising a block 48 provided with a rearwardly-tapering inclined face 48' adapted to receive and tilt the moving bar which is fed through said device as described, having a guide-plate 49 rigidly connected with said block in parallel arrangement, as shown, by the fixed cap or plate 47, and provided with a spring 50 fixed on said cap and having its free end adapted to form a yielding pressure upon the adjacent face of said bar for the purpose of holding it in contact with the supporting-table, whereby the said hoop-bar is tilted to an oblique position for the purpose specified, all substantially as described.

5. In a hoop-making machine a tilting device adapted to convert the bar from a horizontal to an oblique position for the purpose specified, consisting of a block 48 having its inner working face 48' adapted to tilt the bar as described, provided with an inclined guide-plate 49 rigidly connected with said block by a proper connecting-plate and having a spring 50 arranged thereon as shown, and adapted to form a yielding pressure upon the adjacent face of said bar for the purpose specified; together with means for feeding the said bar through said tilting device, all substantially as described.

6. The combination, in a hoop-making machine, of a transverse shaft 51 rotatably mounted in the supporting-frame and having a rigid bevel-gear 53 and the sprocket-wheel 52; the oblique shaft 56' having its upper and lower ends rotatably mounted in a fixed bearing 61' and 57' respectively, on said frame, having near its upper end a fixed roller 65' and upon its lower end a bevel-gear 58 meshing with the said gear 53; the oblique shaft 56 having its extremities rotatably mounted in the journal-boxes 57 and 61 on said frame, the former being pivoted on its support, and the latter being adapted for a limited play against the resistance of a resilient buffer, and provided with a fixed roller 65 in coöperative relation with said roller 65', and having a rigid gear-wheel 60 adapted for an actuating engagement with said gear-wheel 60'; the adjusting-screw 63 mounted in a supporting-bracket, as shown, having a holding-nut 62 and a recessed head 63'; and a rubber buffer 64 fixed in said head and adapted to bear against the face of said journal-box 61, for the purpose specified, all substantially as described.

7. The combination of the shaft 51 having the gear 53 and the sprocket-wheel 52; the oblique shaft 56' mounted as described in the bearings 61' and 57', on the supporting-frame, and having near its upper end a fixed roller 65' and upon its lower end a gear 58 meshing with the said gear 53; the oblique shaft 56 mounted as described in the journal-boxes 57 and 61 on said frame, the former being pivoted on its support and the latter being adapted for a limited play against the resistance of a resilient buffer, and provided with a fixed roller 65 in coöperative relation with said roller 65', and having a rigid gear-wheel 60 in mesh with said gear-wheel 60'; and means for imparting to the said feed-roller 65 a yielding pressure for the purpose specified, all substantially as described.

8. The combination of a supporting-shaft; a cylinder loosely mounted on said shaft and provided with a concentric annular recess; springs located in said recess; a pin or projection on said shaft engaging with perforations of larger diameter in said cylinder; and a weighted lever in contact with said cylinder, the whole constituting an adjusting or equalizing roller feed mechanism for feeding wood strips of unequal thickness, together with means for actuating said shaft, all substantially as described.

FRANK M. KENNEDY.

Witnesses:
 GEO. GUTHRIE,
 H. J. KENNEDY.